April 9, 1946.   R. D. ACTON ET AL   2,397,905
THRUST COLLAR CONSTRUCTION
Filed Aug. 7, 1944
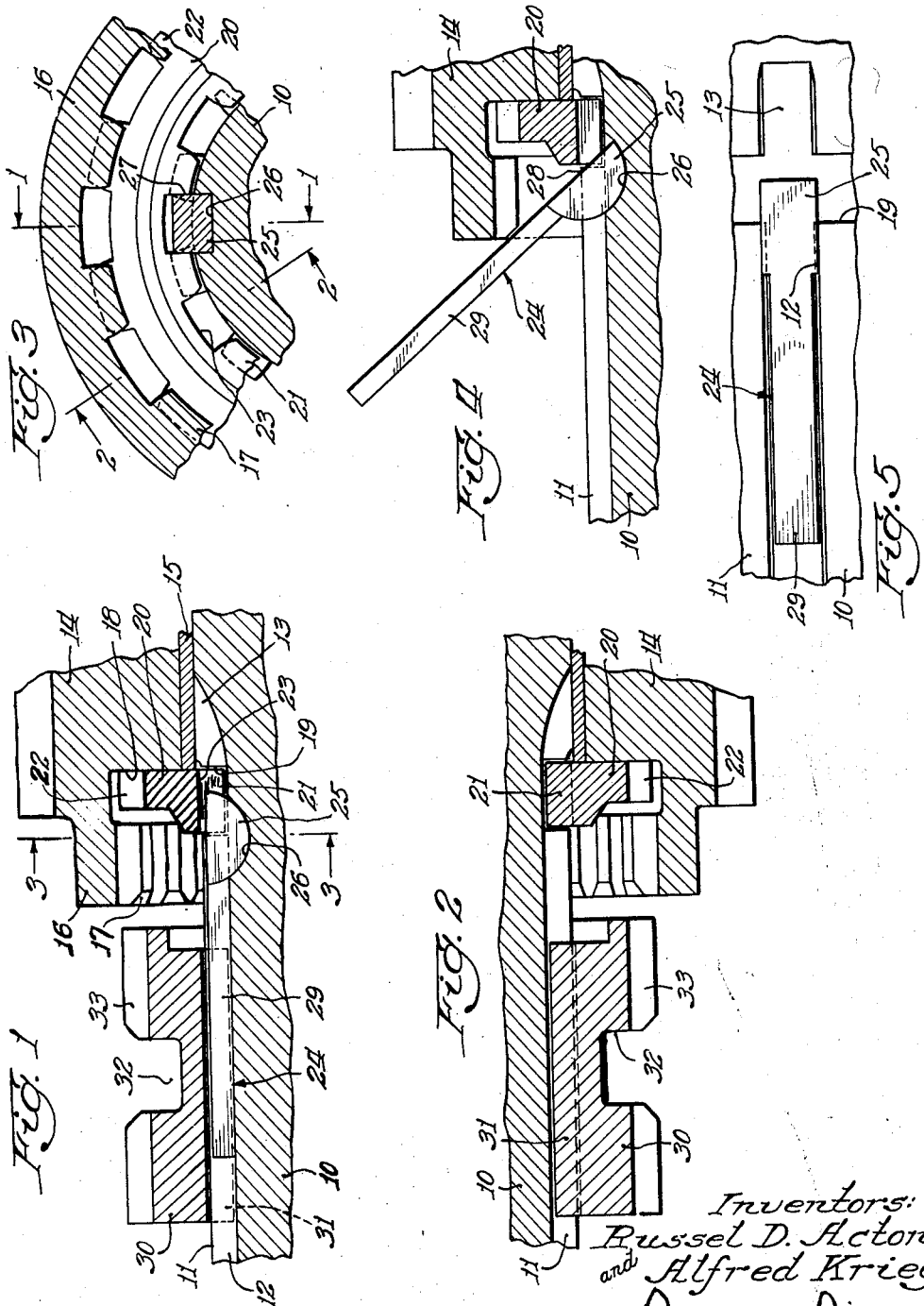
Inventors:
Russel D. Acton
and Alfred Krieg
By: Paul O. Pippel
Atty.

Patented Apr. 9, 1946

2,397,905

UNITED STATES PATENT OFFICE 2,397,905

THRUST COLLAR CONSTRUCTION

Russel D. Acton and Alfred Krieg, Chicago, Ill., assignors to International Harvester Company, a corporation of New Jersey Application August 7, 1944, Serial No. 548,472

8 Claims. (Cl. 308—135)

This invention relates to a thrust collar construction. More specifically it relates to an improved mechanism for securing a thrust collar against angular displacement.

In the construction of transmission gearing, it is desirable to maintain the axial length of the transmission and the associated parts as short as possible. It is also desirable to construct all parts so that they may be readily assembled and positively held in position. In conventional transmission constructions having constant mesh gearing, dental type of clutches are frequently employed. In these transmissions it is necessary to rotatably mount gears on shafts against movement in an axial direction. This invention is particularly concerned with an improvement in holding one element of a dental clutch against axial movement while permitting its rotation.

A principal object of the invention is to provide a novel form of key insertable into its operative position and swingable thereafter into a position where it may be held against movement. A more specific object is to provide a Woodruff key with n extension and to provide means on a sliding member for retaining said extension and thereby ocking the Woodruff key against displacement. Other objects and the means by which they are accomplished will be apparent from the detailed description of a preferred embodiment as shown n the drawing, in which:

Figure 1 is a section taken on a radius of a dental clutch construction embodying the invention;

Figure 2 is a section taken on a radius of the same construction at a different circumferential location·

Figure 3 is a section taken on the line 3—3 of Figure 1. To facilitate inspection of the drawing, Figure 3 has lines 1—1 and 2—2 which may be considered as the sections of Figures 1 and 2.

Figure 4 is a section similar to Figure 1 showing the sliding clutch member removed and the initial step of insertion of the locking key; and Figure 5 is a plan view showing the locking key in its position on the shaft, the other elements being removed to clarify showing of the key and its keyway.

In the drawing, only such parts have been shown of a conventional dental type of clutch as used in transmissions as are necessary to illustrate the invention. A shaft 10, a portion of which is shown in all the figures, is provided with a plurality of splines 11 having grooves or keyways 12 therebetween. Said keyways terminate at 13 in curved surfaces. A gear 14 having a bearing sleeve 15 is shown rotatably mounted at one end of the shaft 10 overlapping the end portions of the splines 11 and the end portions 13 of the keyways 12.

The gear 14 has an extended sleeve portion 16 provided with internal teeth 17. A flat abutment wall 18 is provided at the end of the gear within the sleeve portion 16 and spaced from the teeth 17.

The splines 11 are cut away by notches 19 extending down to the base of the spline and to the bottom of the keyways 12. Said notches 19 may also be considered as providing an annular channel extending around the shaft. A thrust collar 20 provided with a series of projections or keys 21 corresponding in shape and size to the keyways 12 is adapted to be axially slidable over the shaft into a position against the abutment wall 18. Said collar is provided with a plurality of teeth 22 slidable through the grooves between the teeth 17 in order to be insertable therethrough. The keys or teeth 21 on the thrust collar 20 are spaced apart, being separated by notches or recesses 23. Said recesses correspond in size and shape to the keys 11 on the splined shaft 10.

After the thrust collar 20 is moved into position against the abutment face 18, it is rotated angularly the width of one of the keys 11, whereby the projections or keys 21 are moved into alinement with the keys 11. It will be noted that the thickness of the collar 20 in an axial direction corresponds to the axial length of the notches 19, sufficient clearance being allowed for easy assembly. In this position, the thrust collar 20 will withstand thrust from the gear 14 and hold the gear for rotation only and against axial movement in the direction of the thrust collar.

To hold the thrust collar 20 against rotation, a key 24 of a novel construction has been provided. Said key includes a head portion 25 which is formed as a standard Woodruff key. A semicircular seat 26 for said head portion of the key is milled into the shaft 10 extending downwardly between two of the keys 11 of the splined portion of the shaft. This construction is best shown in Figure 3. In order to assure a substantial seat for the head portion 25 of the key which has parallel side walls, the key is as wide as the outside circumferential distance between two of the keys 11, as shown in Figure 3. This assures a full contact of the side walls of the key with the side walls 27 of the milled seat. Such a construction assures that the key cannot tip sideways when forces are exerted thereagainst circumferentially of the shaft. This construction necessitates providing a special keyway in the thrust member 20 by cutting out additional material at the sides of one of the notches 23. It may not be necessary to provide this close fitting contact in some constructions, and applicants' invention is not limited to the close fitting construction illustrated. It is only necessary that the key 24 hold the thrust collar 20 against angular movement. Normally the forces tending to rotate the thrust collar 20 are quite small as there is no positive axial force on the gear 14.

Figure 4 illustrates the position of the key seat 26 with respect to the thrust collar 20. The center 28 of the semicylindrical seat 26 is spaced a short distance away from the outer surface of the thrust collar 20. This assures easy insertion of the key 24 and permits the rocking movement necessary to bring the key into its operating position. The key 24 includes a tail portion 29 which is an integral extension of the head portion 25. Figure 4 indicates sufficient clearance for said tail portion when inserting the key into its operative position. The key is then rocked downwardly with the tail portion 29 lying in one of the keyways 12, as shown in Figures 1 and 5.

A slidable clutch member 30 provided with teeth 31 and an annular recess 32 adapted to be engaged by a shifter member is mounted on the shaft 11. Said member 30 is internally splined, a plurality of splined keys 31 being interfitted with the keys 11 on the shaft 10. One of the keys 31 is removed to provide a space for the tail portion 29 of the key 24. After the member 30 has been assembled on the shaft 10, the key 24 is held against tipping toward the position shown in Figure 4 and is therefore held against movement in any direction as the head portion 25 holds the key against movement in an axial direction and in a circumferential direction.

The teeth 33 on the member 30 are adapted to engage the teeth 17 on the gear 14 thereby providing a dental type clutch of a conventional construction. The operation of applicants' improved thrust collar locking means has been explained in connection with the description of the component parts. An effective lock for the thrust collar is provided by the head portion 25 of the key 24. This portion, which is a standard Woodruff key, is one of the most reliable mechanical means for holding concentric parts against relative angular movement. The seat for the key is readily and economically formed by a milling cutter of a standard design. A key of this type occupies a minimum length of a shaft in axial direction. In the construction disclosed, the tail portion 29 integrally formed with or mechanically connected to the head portion 25 provides a simple means for holding the Woodruff key in position. Space for said tail portion is provided merely by the simple expedient of cutting away one of the splines of the clutch member 30. No special tools or jigs are necessary to provide other locking means.

It is understood that applicants claim as their invention all modifications in thrust collar locking means and other mechanisms falling within the scope of the appended claims.

What is claimed is:

1. In combination with shaft having splines thereon, a gear rotatably mounted on the shaft, a thrust collar having lugs and notches corresponding to the splines adapted to be moved axially over the splined shaft against the gear, said shaft being provided with a circumferential groove adjacent the gear of a radial depth greater than the internal diameter of said lugs whereby the collar may be angularly moved into thrust resisting position, a sliding clutch member mounted on said splined shaft and being provided with internal splines fitting between the splines on the shaft, and a locking key, said shaft having a locking recess formed thereon said key having an end portion insertable in one of the notches of the thrust collar and another portion lying between two of the splines of the shaft under the sliding clutch member, said key also including a projection engageable with said recess by angularly swinging the key into position between the two splines after the end portion has been inserted in the thrust collar notch, said clutch member having one of its splines cut away to provide space for the key.

2. In combination with a splined shaft having splines therein, a gear rotatably mounted on the shaft, a thrust collar having lugs and notches corresponding to the splines adapted to be moved axially over the splined shaft against the gear, said shaft being provided with a circumferential groove adjacent the gear of a radial depth greater than the internal diameter of said lugs whereby the collar may be angularly moved into thrust resisting position, a sliding clutch member mounted on said splined shaft and being provided with internal splines fitting between the splines on the shaft, and a locking key, said shaft having a radially extending recess formed therein between two splines, said key having an end portion insertable in said recess and in one of the notches of the thrust collar by an angular rocking movement and another portion movable by said rocking movement to lie between two of the splines of the shaft and under the sliding clutch member, said clutch member having one of its splines cut away to provide space for the key.

3. In combination with a splined shaft having splines therein, a gear rotatably mounted on the shaft, a thrust collar having lugs and notches corresponding to the splines adapted to be moved axially over the splined shaft against the gear, said shaft being provided with a circumferential groove adjacent the gear of a radial depth greater than the internal diameter of said lugs whereby the collar may be angularly moved into thrust resisting position, a sliding clutch member mounted on said splined shaft and being provided with internal splines fitting between the splines on the shaft, and a locking key, said shaft having a radially extending recess formed therein adjacent said collar, said key having an end portion insertable in said recess and in one of the notches of the thrust collar and another portion lying between two of the splines of the shaft and under the sliding clutch member, said clutch member having one of its splines cut away to provide space for the key.

4. In combination with shaft having splines thereon, a gear rotatably mounted on the shaft, a thrust collar having lugs and notches corresponding to the splines adapted to be moved axially over the splined shaft against the gear, said shaft being provided with a circumferential groove adjacent the gear of a radial depth greater than the internal diameter of said lugs whereby the collar may be angularly moved into thrust resisting position, a sliding clutch member mounted on said splined shaft and being provided with internal splines fitting between the splines on the shaft, and a locking key, said shaft having a semi-cylindrical key seat formed between two splines, said key having an end portion formed as a Woodruff key insertable in one of the notches of the thrust collar and in said key seat and another portion lying between two of the splines of the shaft under the sliding clutch member, said clutch member having one of its splines cut away to provide space for the key.

5. In combination with a shaft having splines thereon, a gear rotatably mounted on the shaft, a thrust collar having lugs and notches corresponding to the splines adapted to be moved axially over the splined shaft with one face in abutment against the gear, said shaft being provided with a circumferential groove adjacent the gear in alignment with said collar of a radial depth greater than the internal diameter of said lugs and of the same width whereby the collar may be angularly moved into thrust resisting position, a sliding clutch member mounted on said splined shaft and being provided with internal splines interfitting with the splines on the shaft, and a locking key, said shaft being provided with a semicylindrical Woodruff key seat having its center spaced from the non-abutting face of the thrust collar and with a substantial portion underlying the thrust collar, said key having an end portion formed as a Woodruff key insertable in one of the notches of the thrust collar and in the key seat and another portion lying between two of the splines of the shaft and under the sliding clutch member, said clutch member having one of its splines cut away to provide space for the key.

6. In combination, a shaft having a section formed with splines, a sliding clutch member formed with splines interfitted with the splines on the shaft, a gear rotatably mounted on the shaft and carrying a clutch member thereon, a thrust collar adapted to hold the gear against axial movement, said collar having lugs and notches therebetween formed to receive the splines of the shaft, said shaft being provided with notches in the splines thereon adjacent the gear of a radial depth greater than the internal diameter of said lugs to permit relative angular movement of the collar with respect to the shaft into a locked position with the lugs on the collar being in alinement with the splines on the shaft, and a key having an end portion insertable between two of the shaft splines and in one of the notches of the collar, said key having a radial projection extension, and said shaft being formed with a corresponding recess to receive said projection and to permit the key to be inserted and subsequently rocked into operative position, said key having an extended tail portion adapted to fit between two of the shaft splines, and said clutch member having one spline removed to provide space for said tail portion.

7. In combination, a shaft having a section formed with splines, a sliding clutch member formed with splines interfitted with the splines on the shaft, a gear rotatably mounted on the shaft and carrying a clutch member thereon, a thrust collar adapted to hold the gear against axial movement, said collar having lugs and notches therebetween formed to receive the splines of the shaft, said shaft being provided with notches in the splines thereon adjacent the gear of a radial depth greater than the internal diameter of said lugs to permit relative angular movement of the collar with respect to the shaft into a locked position with the lugs on the collar being in alinement with the splines on the shaft, and a key having an end portion insertable between two of the shaft splines and in one of the notches of the collar, said end portion having a semicircular extension, and said shaft being formed with a corresponding circular recess to receive said extension and to permit the key to be rocked into operative position, said key having an extended tail portion adapted to fit between two of the shaft splines, and said clutch member having one spline removed to provide space for said tail portion.

8. In combination, a shaft having a section formed with splines, a sliding clutch member formed with splines interfitted with the splines on the shaft, a gear rotatably mounted on the shaft and carrying a clutch member thereon, a thrust collar adapted to hold the gear against axial movement, said collar having lugs and notches therebetween formed to receive the splines of the shaft, said shaft being provided with notches in the splines thereon adjacent the gear of a radial depth greater than the internal diameter of said lugs to permit relative angular movement of the collar with respect to the shaft into a locked position with the lugs on the collar being in alinement with the splines on the shaft, a key having an end portion insertable between two of the shaft splines and in one of the notches of the collar, said end portion having a semicircular projection extending in a radial direction towards the center of the shaft, and said shaft being formed with a corresponding circular recess partially underlying the collar to receive said end portion and to permit the key to be inserted and rocked into operative position, said key having an extended tail portion adapted to fit between two of the shaft splines after the key is rocked into operative position, and said clutch member having one spline removed to provide space for said tail portion.

RUSSEL D. ACTON.
ALFRED KRIEG.